United States Patent
Newstead

[15] 3,656,590
[45] Apr. 18, 1972

[54] CALIPER DISC BRAKE AND RESILIENT MOUNTING MEANS THEREFOR

[72] Inventor: Charles Newstead, Walsall, England
[73] Assignee: Girling Limited, Tyseley, Birmingham, England
[22] Filed: June 19, 1967
[21] Appl. No.: 646,890

[30] Foreign Application Priority Data
June 18, 1966  Great Britain......................27,317/66

[52] U.S. Cl..............................................188/73.4, 188/73.3
[51] Int. Cl................................................F16d 55/224
[58] Field of Search................188/73, 73 CL, 73 C, 205.3, 188/196 P

[56] References Cited

UNITED STATES PATENTS

| | | | |
|---|---|---|---|
| 2,784,811 | 3/1957 | Butler | 188/73 |
| 3,053,346 | 9/1962 | Butler | 188/73 |
| 3,109,518 | 11/1963 | Chouings | 188/73 |
| 3,133,614 | 5/1964 | Lang | 188/73 |
| 3,260,332 | 7/1966 | Wells | 188/73 |
| 3,265,160 | 8/1966 | Elberg et al. | 188/73 |

FOREIGN PATENTS OR APPLICATIONS 565,708  3/1958  Belgium..................................188/73

Primary Examiner—George E. A. Halvosa
Attorney—Scrivener, Parker, Scrivener and Clarke

[57] ABSTRACT

The invention relates to a reaction type caliper disc brake with a fabricated yoke or clamping member movable relative to a stationary torque carrier member adapted for fixing to a vehicle. The clamping member comprises a pair of chordal beams connected by tie rods passing through clearance holes in the carrier member and is supported on the carrier member by resilient bush and pin assemblies, compression of the resilient bushes during circumferential movement of the clamping member produced by friction forces in a braking operation being limited by abutment surfaces provided on the carrier member and engageable by back plates of the friction pad assemblies.

8 Claims, 3 Drawing Figures

CALIPER DISC BRAKE AND RESILIENT MOUNTING MEANS THEREFOR

This invention concerns a disc-brake, and relates more particularly to a reaction-type caliper disc-brake.

According to the present invention there is provided a disc-brake assembly which comprises a brake rotor, a carrier member adapted for connection with a part of a vehicle, a clamping member straddling a portion of the periphery of the brake rotor, means including a pair of circumferentially spaced pin and resilient bush assemblies extending between said carrier member and said clamping member through or within axially extending registering holes or passages within or through said members for supporting said clamping member on and for axial movement relative to said carrier member, friction pad means supported in said assembly on opposite sides of the brake rotor, brake actuating means for moving one of said friction pad means into braking engagement with the brake rotor and thereby effecting axial displacement of the clamping member by reaction to bring the other friction pad means into engagement with the opposite side of the brake rotor and abutment means on said carrier member separate from said pin and bush assemblies providing a reaction for the friction forces transmitted to the clamping member during braking and additionally acting to limit compression of the resilient bushes resulting from circumferential movement of the clamping member produced by said engagement.

A pair of pins may conveniently be provided passing through holes at the outer edge region of the back plate in order to prevent outward movement of the pads.

Preferably the tie rods have a clearance in holes provided in the torque taking member and means are provided to maintain the tie rod concentrically within the holes.

One embodiment provides a pair of pin and resilient bush assemblies associated with the torque-taking member and with each of the chordally extending beams and arranged so that the rods are maintained concentrically within the holes.

Another embodiment provides resilient bushes incorporated into the holes, the bushes maintaining the rods concentrically within the holes. The bushes may be of resilient metal form, entirely of rubber or a steel ring backed by rubber where the rod is required to slide through the resilient ring.

In another embodiment the rods are coupled to the chordally extending beams through spherical joints permitting quasi-articulation.

The tie rods may be of adjustable effective length so that manual or automatic adjustment may be accomplished to compensate for wear of the friction pads.

The whole mechanism is preferably weather proofed by protecting the normally exposed sliding faces, such as ties rods and hydraulic pistons, with rubber boots.

Conveniently, one of the beams carries one or a plurality of circumferentially spaced hydraulic pistons and cylinders linked such that upon being energised the adjacent pad is applied directly against the disc and the other pad is applied by movement of the yoke due to the reaction force.

The end edges or faces of recesses provided in the torque taking member to receive the friction pad assemblies may be provided with curves to constitute an abutment for the pad back plates for taking the drag when the brake is applied and for radially locating the pads.

When the pads are in contact with a rotating disc, the beams and the friction pads move circumferentially in the direction of the disc rotation until the pad back plate strikes its abutment on the stationary member. If no clearance were provided between the rods and the holes, the rods would act to transmit part of the brake drag to the torque carrier. Further the clearance allows the yoke to pitch or yaw due to disc distortion. Another advantage is that the tie rods are supported and/or guided over a large proportion of their length. Finally, the sliding of the rod in the hole is not impaired by cross-binding consequent upon brake drag.

The present invention will be described further by way of example, with reference to the accompanying, generally diagrammatic drawings, in which.

Figure 1:
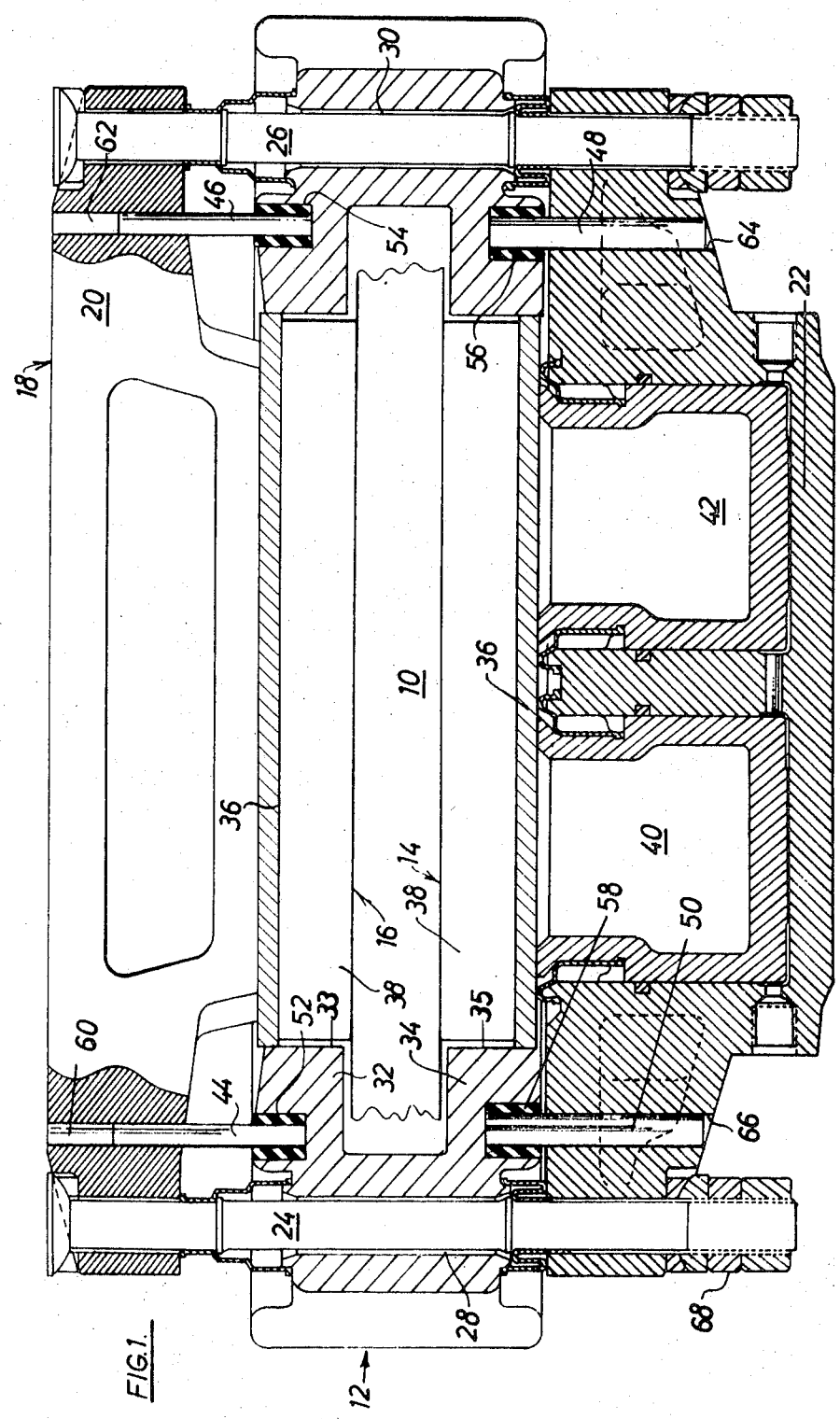
FIG. 1 represents a sectional view of one preferred embodiment of the invention.
Figure 2:
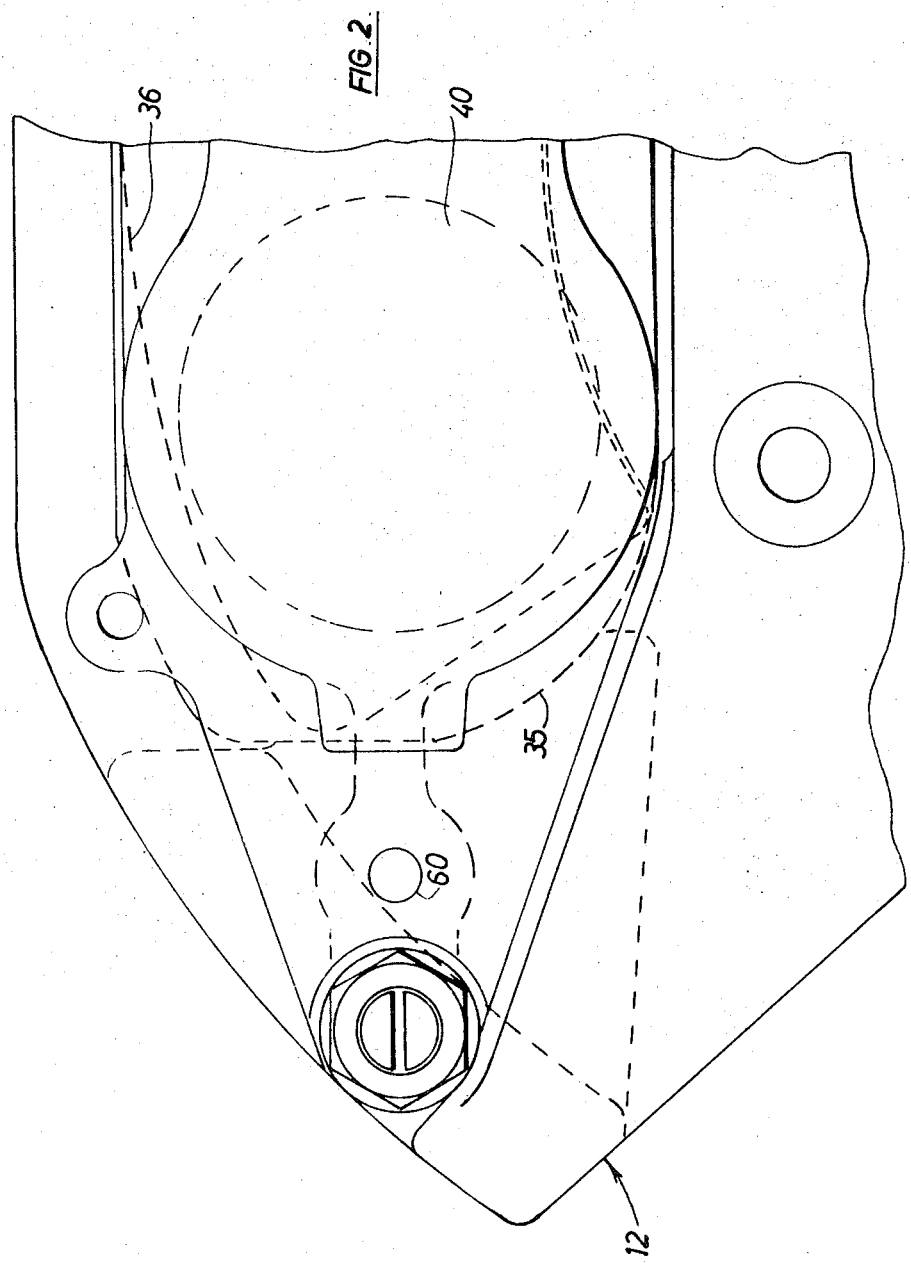
FIG. 2 is a front elevation of the brake.

Referring to FIGS. 1 and 2, a disc-brake assembly comprises a disc 10, a torque taking member or torque carrier 12, a pair of friction pad assemblies 14 and 16, and a yoke assembly or clamping member 18 axially slidable on the torque taking member 12. The yoke assembly 18 includes a pair of beams 20 and 22 directed chordally relative to the disc 10 and connected by a pair of tie rods 24 and 26 passing through and having clearance in holes 28 and 30 in the torque taking member 12. The torque taking member 12 includes a pair of parallel limbs 32 and 34 recessed or apertured to receive friction pad assemblies 14 and 16, each of which includes a back plate 36 and a pad of friction material 38. The end faces 33 of the limbs 32 act as abutments for the pad back plate 36 of the indirectly actuated friction pad assembly, while the end faces 35 of the limbs 34 constitute guide surfaces for guiding the movement of the directly actuated friction pad assembly and for radially locating the same in the yoke assembly. Chordally extending beam 22 is provided with a pair of circumferentially spaced hydraulic pistons 40 and 42. To maintain the tie rods 24 and 26 concentric with the holes 28 and 30 in the normal off condition of the brake, there are provided four pins 44, 46, 48 and 50 mounted in resilient bushes 52, 54, 56 and 58 in the torque taking member 12, and slidably mounted in holes 60, 62, 64 and 66 in the beams 20 and 22.

Figure 3:
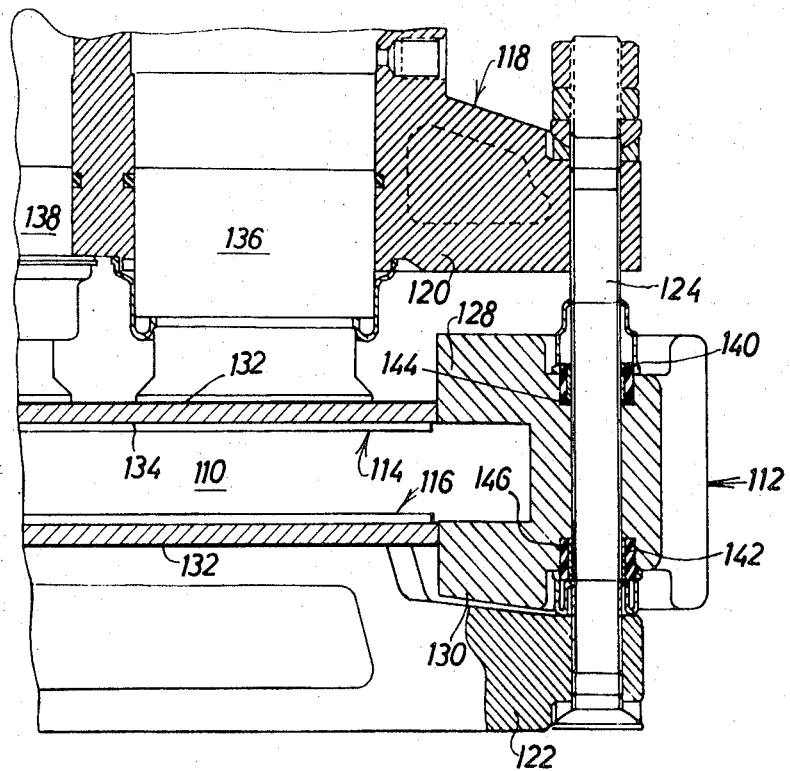
FIG. 3 is a sectional view of part of another embodiment of the invention.

Referring to FIG. 3, a brake assembly comprises a disc 110, a torque taking member 112, a pair of friction pad assemblies 114 and 116, and a yoke assembly 118 axially slidable on the torque taking member 112. The yoke assembly 118 includes a pair of beams 120 and 122 directed chordally relative to the disc 110 and connected by a pair of tie rods, one only (124) of which is shown passing through and having clearance in two holes, only one 126 of which is shown, in the torque taking member 112. The torque taking member 112 includes a pair of parallel limbs 128 and 130 recessed to receive friction pad assemblies 114 and 116, each of which includes a back plate 132 and a pad of friction material 134. Chordally extending beam 120 is provided with a pair of circumferentially spaced hydraulic pistons 136 and 138. To maintain the tie rod 124 concentric with the hole 126 there are provided a pair of metal ferrules 140 and 142 each backed by a rubber cylinder 144 and 146.

I claim:

1. A disc brake assembly comprising a brake rotor, a stationary carrier member, a clamping member straddling a portion of the periphery of the rotor, said clamping and carrier members having axially extending, registering passage means therein, pin means extending between said carrier and clamping members and axially received in said passage means for supporting said clamping member for axial movement with respect to said carrier member, said pin means being fixed to one of the members so that there is relative movement between said pin means and the other of said members when said clamping member is moved with respect to said carrier member, at least part of the passage means in one of said members being greater in cross sectional size than the corresponding part of the pin means received therein, resilient bushing means supporting said pin means within and in spaced relation with respect to said last mentioned part of said passage means, a pair of brake pads on opposite sides of the rotor, means for directly applying one of said pads to one face of said rotor and by reaction effecting axial movement of the clamping member in the opposite direction to apply the other pad to the other face of the rotor, and fixed abutment means on said carrier member separate from said pin means for limiting circumferential movement of said clamping member with respect to said carrier member and consequent compression of said bushing means by said pin means upon application of said pads to said rotor, said clamping member comprising a yoke assembly supported by the pin and resilient bushing means for axial sliding movement on the carrier member, said yoke assembly comprising a pair of chordal beams on opposite sides of the brake rotor and tie rods connecting said beams, said tie rods passing through clearance holes in said carrier member, and wherein said carrier member includes a pair of parallel limbs situated with one on each side of the brake rotor and respectively formed with guide surfaces for the directly actuated friction pad means and with abutment surfaces constituting the abutment means for the other friction pad assembly.

2. A disc brake assembly as set forth in claim 1, wherein said parallel limbs are recessed to receive the friction pad means and wherein the respective free end faces of the recesses are formed with said guide surfaces and said abutment surfaces.

3. A disc brake assembly as set forth in claim 1, wherein each end of each tie rod is provided with a spherical joint acting between said tie rod and the adjacent chordal beam.

4. A disc brake assembly as set forth in claim 1, wherein each resilient bushing means comprises a metal ring carrying a rubber annulus.

5. A disc assembly as set forth in claim 1, wherein each tie rod is of adjustable effective length.

6. A disc brake assembly as set forth in claim 1 wherein said carrier member includes axially opposed and circumferentially spaced regions, said passage means in said carrier member comprising axially directed blind bores in said spaced regions, said bushing means being arranged one in each of said bores, said pin means being axially located in each of said bushing means, the registering passage means in said clamping member slidingly receiving said pin means.

7. A disc brake assembly as set forth in claim 1 wherein said pin means comprises said tie rods and wherein said passage means in said carrier member comprises said clearance holes, said bushing means being arranged at each end of said clearance holes and cooperating with said tie rods to support said yoke assembly for movement relative to said carrier member.

8. The disc brake assembly of claim 1 wherein said pin means is fixed to said clamping member, and said last mentioned parts of said passage means and said bushing means are in said carrier member.

* * * * *